United States Patent [19]

Scheerer

[11] 4,230,415
[45] Oct. 28, 1980

[54] BALL-JOINT WITH LOCKING DEVICE

[75] Inventor: Wolfgang Scheerer, Meerbusch, Fed. Rep. of Germany

[73] Assignee: A. Ehrenreich GmbH & Co. KG, Düsseldorf, Fed. Rep. of Germany

[21] Appl. No.: 961,467

[22] Filed: Nov. 16, 1978

[30] Foreign Application Priority Data

Dec. 22, 1977 [DE] Fed. Rep. of Germany ....... 2757198

[51] Int. Cl.³ .................. F16C 11/00; F16D 1/12
[52] U.S. Cl. ................................................ 403/122
[58] Field of Search ............... 403/134, 144, 122, 132, 403/135

[56] References Cited

U.S. PATENT DOCUMENTS

| 2,635,906 | 8/1953 | Graham et al. | 403/135 X |
| 3,574,369 | 4/1971 | Andrew | 403/132 |
| 3,679,248 | 7/1972 | Herbenar | 403/144 X |
| 3,862,807 | 1/1975 | Doden | 403/135 |

FOREIGN PATENT DOCUMENTS 532921 11/1956 Canada ..................................... 403/122
497113 8/1954 Italy ......................................... 403/122

Primary Examiner—Wayne L. Shedd
Attorney, Agent, or Firm—Ernest F. Marmorek

[57] ABSTRACT

A ball-joint has a hollow housing, and a ball in contact with a socket in the housing; and a locking device is disposed between the largest diameter of the ball and the device which supports the locking device, so that the ball is restrained from moving off the ball socket when the pin shaft is pulled in the direction away from the ball socket. A plurality of locking rings is produced by fabricating a resiliently deformable longitudinal rod, forming the rod into a helix, and cutting the helix parallel to the longitudinal axis.

5 Claims, 3 Drawing Figures

BALL-JOINT WITH LOCKING DEVICE

FIELD OF THE INVENTION

The invention relates to a device for retraining a ball within a ball socket of a ball-joint assembly, to resist outward motion when a pin shaft attached to the ball is moved in a direction away from the socket.

The invention also provides a method of manufacturing multiple locking rings from a helix of deformable, resilient material.

BACKGROUND OF THE INVENTION

There are known locking devices, which are used with ball-joint assemblies of the type that have a pin shaft protruding from an opening in the housing. In these ball-joint assemblies, the cover used for sealing the openings is the locking device.

These known locking devices are difficult and expensive to manufacture. They are most often produced by stamping rings from sheet metal. The stamped rings have some faces that must subsequently be machined to have the shape needed for close contact with the ball surface.

These known locking rings have other disadvantages in terms of safety. Upon repeated use, such as by alternating loads, the ball frequently deforms the locking device into a funnel-shape, and as a result, the ball emerges from the housing. Additionally, space limitations rarely permit reinforcing the dimensions of the locking device, and a high strength material is prohibitive in cost. Alternatively, if hardening of the locking ring is attempted, further difficulties arise as hardening causes unavoidable distortions and would require a subsequent surface grinding that is very costly.

SUMMARY OF THE INVENTION

It is accordingly one of the principal objects of the present invention to increase the reliability of a ball-joint assembly.

The invention accomplishes this by increasing the resistance of the ball to being pushed out from the socket, by having a locking device of a width smaller than the largest diameter of the ball and positioned between the largest diameter of the ball and the flange which supports the locking device inside the housing. This locking device restrains the ball from moving off the ball socket when the pin shaft secured to the ball is pulled in a direction away from the ball socket.

In accordance with a preferred embodiment of the invention, the locking device is supported by a flange projecting from the housing towards the center of an opening in the housing. This flange can be formed from a milled edge.

In accordance with another preferred embodiment, the locking device is a locking ring that is split along a separating line, so as to form a gap. This separating line may run radially; however, it also may be inclined in any desired direction, depending upon the method of manufacturing of the locking device. In this embodiment, the locking device is made from carbon steel wire, or other elastically deformable material, so that it can be easily inserted into the housing beyond the support or flange. This locking device may also be inserted into a groove for proper positioning. This gap is dimensioned so as to be as wide as required, in order that the locking ring may be easily inserted into the housing.

Another object of the present invention is to provide a method for simplifying the manufacture of locking rings, and to thereby substantially lower the cost of manufacturing.

The present invention accomplishes this by producing locking rings by forming a helix from a longitudinal rod. This longitudinal rod should be resiliently deformable and it may be made of metallic material, such as carbon steel wire. The longitudinal rod should be dimentioned so that it has the proper cross-section for its intended formation into a helix. This longitudinal rod may be manufactured having any desired cross-section by extrusion from a metallic material. A cut is then made in the helix, parallel to the axis of the helix. In one embodiment, the cutting is carried out at one of the intersections of an axial plane with the helix. The finished ring is substantially cheaper than any locking ring made in a conventional manner. In addition, the force required to pull the ball from the socket is increased by 20% to 50%, compared to a conventional ball-joint assembly.

Further objects and advantages of the invention will be set forth in part in the following specification, and in part will be obvious therefrom without being specifically referred to, the same being realized and attained as pointed out in the claims.

Accordingly, the objects of the present invention are recited by providing, in a ball-joint assembly, which includes a hollow housing having an opening on one side, a generally hemispherical ball socket within the housing, a ball, including a part in contact with the socket, a pin shaft extending from the ball through the opening, supporting means in the housing near the opening; and locking means supported by the supporting means and at least partly surrounding a portion of the ball and having an inner width smaller than the largest diameter of the ball, and being positioned between the largest diameter of said ball and the supporting means, so that the ball is restrained from being removed off the ball socket when the pin shaft is pulled in a direction away from the ball socket.

It is further advantageous if the supporting means is defined by a groove, the locking means fitting into the groove, upon insertion into the housing.

It is also advantageous if the supporting means is a flange projecting from the housing towards the center of the opening.

It is also preferable if the locking ring is elastically deformable so as to be easily inserted into the housing beyond the flange.

It is further advantageous that the ball-joint assembly include a sealing means for sealing the opening against the entry of dust.

It is also advantageous if the locking means includes a discontinuous locking ring which locking ring is preferably made of carbon steel wire.

It is further advantageous if in the method for producing a plurality of locking, the steps include fabricating a resiliently deformable longitudinal rod; forming the rod into a helix having an axis; and cutting the helix along a line substantially parallel to the axis throughout at least a part of the axial length of the helix.

It is further advantageous if the step of fabricating the rod includes manufacturing the rod with the desired cross-section from a metallic material by extrusion.

It is also advantageous if the step of cutting is carried out at one of the intersections of the axial plane of the helix with the helix.

With the above and other objects of the invention in view, the invention consists of the novel methods, construction, arrangement, and combination of various devices, elements and parts, as set forth in the claims hereof, one embodiment of the same being illustrated in the accompanying drawings and described in the specifications.

BRIEF DESCRIPTION OF THE DRAWINGS

For a better understanding of the instant invention, reference is had to the following detailed description, taken in connection with the accompanying drawing, in which.

DESCRIPTION OF THE PREFERRED EMBODIMENTS

Figure 1:
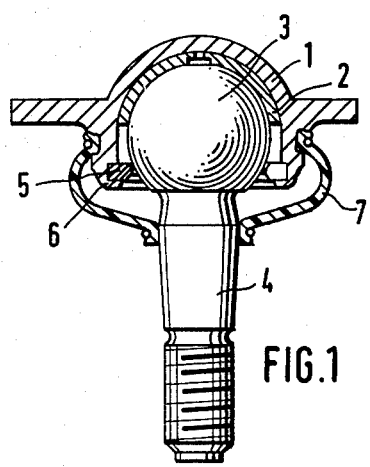
FIG. 1 is a sectional view of a ball-joint with a locking ring.
Figure 2:
FIG. 2 is a large scale sectional view of a locking ring.

In carrying the invention into effect, in one of the embodiments which have been selected for illustration in the accompanying drawings and for description in the specification, and referring now particularly to FIG. 1, there is a housing 1 which contains a ball socket 2, within which is disposed a ball head 3. A pin shaft 4 is secured to the ball head 3.

In the housing 1, there is disposed a locking means, such as a locking ring 5 nestled in a recess, and supported by support means, such as a flange produced by flanging a milled edge 6. The pin shaft 4 protrudes through the locking ring 5, from an opening in the housing 1. The opening is closed off by a sealing device 7. The locking ring 7 is a normally open ring, made of resiliently deformable material, such as carbon steel wire. The locking ring 5 has a separating line or gap 8, which is formed when the locking rings are produced from a helix, which is cut parallel to its axis.

Figure 3:
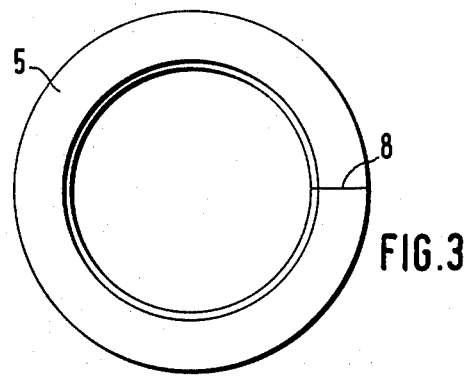
FIG. 3 is a plan view of the locking ring and ball.

When the locking ring is inserted into the housing 1, it is, however, operatively closed, as can be seen from FIG. 3, as the inner diameter of the housing is slightly larger than the diameter of the locking ring 7, when the locking ring 7 is not subjected to any stresses, and when its ends therefore define a gap 8 of finite dimensions.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a ball-joint assembly, including a hollow housing having an opening on one side,
   comprising in combination:
   a generally hemispherical ball socket within said housing;
   a ball, including a part in contact with said socket;
   a pin shaft extending from said ball through said opening;
   supporting means in said housing near said opening; and a discontinuous elastically deformable, but operatively rigid and closed locking ring supported by said supporting means and at least partly surrounding a portion of said ball, having an inner width smaller than the largest diameter of the ball, and being positioned between said largest diameter of said ball and said supporting means, whereby the ball is restrained from being removed off said ball socket when said pin shaft is pulled in a direction away from said ball socket.

2. In a ball-joint assembly as claimed in claim 1, wherein said supporting means is defined by a groove, said locking ring fitting into said groove, upon insertion into said housing.

3. In a ball-joint assembly as claimed in claim 1, wherein said supporting means is a flange projecting from said housing towards the center of said opening.

4. In a ball-joint assembly as claimed in claim 3, wherein said locking ring is inserted into said housing beyond said flange.

5. In a ball-joint assembly as claimed in claim 1, further comprising sealing means for sealing said opening against the entry of dust.

* * * * *